United States Patent
Kim (10) Patent No.: US 8,965,916 B2
(45) Date of Patent: Feb. 24, 2015

(54) METHOD AND APPARATUS FOR PROVIDING MEDIA CONTENT

(75) Inventor: Doek Hoon Kim, Anyang-si (KR)

(73) Assignee: International Language Education Development Institute, Ansan-si, Gyeonggi-do (KR)

( * ) Notice: Subject to any disclaimer, the term of this patent is extended or adjusted under 35 U.S.C. 154(b) by 524 days.

(21) Appl. No.: 13/144,023

(22) PCT Filed: Feb. 23, 2011

(86) PCT No.: PCT/KR2011/001216
§ 371 (c)(1),
(2), (4) Date: Jul. 11, 2011

(87) PCT Pub. No.: WO2011/084039
PCT Pub. Date: Jul. 14, 2011

(65) Prior Publication Data
US 2011/0270877 A1   Nov. 3, 2011

(30) Foreign Application Priority Data
Apr. 7, 2010   (KR) .................... 10-2010-0031681

(51) Int. Cl.
*G06F 17/30*   (2006.01)
*G06Q 10/10*   (2012.01)

(52) U.S. Cl.
CPC ........ *G06F 17/30056* (2013.01); *G06Q 10/10* (2013.01)
USPC .......................................... 707/769

(58) Field of Classification Search
CPC ................... G06F 17/30796; G06F 17/30056; G06F 17/30017
See application file for complete search history.

(56) References Cited

U.S. PATENT DOCUMENTS

| | | | |
|---|---|---|---|
| 2004/0025180 A1* | 2/2004 | Begeja et al. | 725/46 |
| 2005/0216443 A1* | 9/2005 | Morton et al. | 707/3 |
| 2009/0204321 A1* | 8/2009 | Shinohara et al. | 701/209 |

* cited by examiner

*Primary Examiner* — Dinku Gebresenbet
(74) *Attorney, Agent, or Firm* — Sherr & Jiang, PLLC (57) ABSTRACT

A method and apparatus for providing media content such as audio and video using caption information as a search medium is provided. In the method, in response to a search request from a user terminal, a media content item including a search term is collected through search based on input of the search term. Media sections including the search term are extracted from a plurality of media sections included in the collected media content item. Text items synchronized with the extracted media sections are provided as a list.

19 Claims, 4 Drawing Sheets

METHOD AND APPARATUS FOR PROVIDING MEDIA CONTENT

CROSS REFERENCE TO PRIOR APPLICATIONS

This application is a National Stage Patent Application of PCT International Patent Application No. PCT/KR2011/001216 (filed on Feb. 23, 2011) under 35 U.S.C. §371, which claims priority to Korean Patent Application No. 10-2010-0031681 (filed on Apr. 7, 2010), which are all hereby incorporated by reference in their entirety.

TECHNICAL FIELD

The present invention relates to a method and apparatus for providing media content such as audio and video using caption information as a search medium.

BACKGROUND ART

The range of information that can be searched using web-based search engines has been extended beyond text-based web documents to multimedia such as audio, image, and video.

Recently, interest in video search has increased along with widespread introduction of services that allow users to upload various videos to a site to share the various video with other users. A number of portal sites have launched search engines that can easily search for multimedia such as video.

Since most search engines perform search by analyzing and using file formats, file names, and metadata of multimedia as search elements, the engines only provide search results obtained based on such file formats, file names, and metadata that are determined when multimedia data is generated.

A conventional search engine, which converts voice included in multimedia content into caption data using a voice recognition technology and performs search using the caption data as a search medium, has also been developed. When providing multimedia content items including an input search term as search results, this conventional search engine primarily provides a list of titles of the multimedia content. Therefore, in order to find sections of the multimedia content items including the search term, it is necessary to play and check each section included in the multimedia content items one by one, thereby increasing inconvenience.

In addition, when converting voice into caption data using a voice recognition technology, the conventional search engine cannot identify sentences in the caption data. That is, the caption data produced through conversion of voice only includes a series of words and does not include periods such that it is not possible to discriminate between sentences in the caption data. Since it is not possible to discriminate between sentences including the search term, it is not possible to provide a solution that can search for media sections associated with sentences. This is because it is not possible to divide a media content item into a plurality of media sections that are synchronized with sentences, phrases, clauses, or words although it is possible to divide media content on a time or capacity basis to generate a plurality of media sections.

As a result, in the conventional technology, it is not possible to extract only sections (media sections) including the search term from all sections (media sections) of media content items found as search results such that it is not possible to stream only the media sections including the search term among all media sections of the media content items. Thus, there is a need to provide a novel solution that can search for only media sections that are synchronized with sentences, phrases, clauses, or words and can stream only the media sections as search results.

DISCLOSURE

Technical Problem

Accordingly, the present invention is directed to a method and apparatus for providing media content that substantially obviates one or more problems due to limitations and disadvantages of the related art.

An object of the present invention is to provide a method and apparatus for providing media content, wherein it is possible to collect media content items, each of which is divided into a plurality of media sections to be synchronized with words, phrases, clauses, or sentences, and it is possible to search for media sections based on a search term in the collected media content items.

Another object of the present invention is to provide a method and apparatus for providing media content, wherein media sections obtained as search results based on a search term are provided as a list including text items synchronized with the media sections and a media section is streamed as a corresponding text item is selected from the list.

Another object of the present invention is to provide a method and apparatus for providing media content, which supports search of media sections based on captions inserted in media content such as video or based on a speaker in the caption and provides partial captions corresponding to a search term as a text list or provides speakers corresponding to the search term and captions associated with the speakers as a text list, thereby achieving media section search based on a search term.

Technical Solution

To achieve these objects and other advantages and in accordance with the purpose of the invention, as embodied and broadly described herein, there is provided a method for providing media content from a server that provides search results to a user terminal in response to a search request from the user terminal, the method including collecting a media content item including a search term through search based on input of the search term, extracting a media section including the search term from a plurality of media sections included in the collected media content item, and providing a text item synchronized with the extracted media section as a list, wherein the text item includes at least one of a caption synchronized with the media section and speaker information associated with the caption, wherein the media content item includes a content identifier identifying the media content item, section identifiers identifying the plurality of media sections included in the media content item, and a word identifier, a phrase identifier, a clause identifier, or a sentence identifier identifying a word, phrase, clause, or sentence in the caption included in the text item, and wherein, when the speaker information is included in the text item, the media content item further includes a speaker identifier identifying the speaker information.

In another aspect of the present invention, an apparatus for providing media content includes a server for collecting a media content item including a search term received from a user terminal through search based on input of the search term, providing the user terminal with a text item synchronized with a media section including the search term extracted from a plurality of media sections included in the collected media content item as a list, and streaming, upon receiving a command to select a text item included in the list from the user terminal, a specific media section corresponding to the selected text item to the user terminal, wherein the text item includes at least one of a caption synchronized with the media section and speaker information associated with the caption, wherein the media content item includes a content identifier identifying the media content item, section identifiers identifying the plurality of media sections included in the media content item, and a word identifier, a phrase identifier, a clause identifier, or a sentence identifier identifying a word, phrase, clause, or sentence in the caption included in the text item, and wherein, when the speaker information is included in the text item, the media content item further includes a speaker identifier identifying the speaker information.

Advantageous Effects

As is apparent from the above description, a method and apparatus for providing media content according to the present invention have a variety of advantages. For example, since it is possible to divide each media content item into a plurality of media sections that are synchronized with words, phrases, clauses, or sentences, it is possible to search for media sections based on a search term. That is, it is possible to search for only sections (media sections) including a search term among all sections (media sections) of media content items.

In addition, the method and apparatus according to the present invention supports a novel type of media search that provides media sections obtained as search results based on a search term as a list including text items synchronized with the media sections and thus provides a novel solution that selectively streams only sections (media sections) of media content including the search term.

Further, the method and apparatus supports search of media sections based on captions inserted in media content such as video or based on speakers in the captions and provides partial captions corresponding to a search term as a text list or provides speakers corresponding to the search term and captions associated with the speakers as a text list, thereby achieving media section search based on a search term.

BEST MODE

The above and other objects, features and other advantages of the present invention will be more clearly understood from the following detailed description taken in conjunction with the accompanying drawings.

The configuration and operation of preferred embodiments of the invention will now be described with reference to the accompanying drawings. The configuration and operation of the invention, illustrated in the drawings and described below with reference to the drawings, will be described using at least one embodiment without limiting the spirit and the essential configuration and operation of the invention.

Preferred embodiments of a method and apparatus for providing media content according to the present invention will be described below in detail with reference to the accompanying drawings. A method and apparatus for acquiring media content will also be described in association with the method and apparatus for providing media content according to the present invention.

In the present invention, a media content item includes a plurality of media sections, each of which has a file format encoded in synchronization with a text expression including at least one word, phrase, clause, or sentence. For example, a media content item has a structure as shown in the following Table 1.

TABLE 1

| File_ID | Sentence_ID=1 | <Speaker = Host ><br><sync start = 5    sync end = 10><br><word/The children of today are interested riding a bike./word> |
|---|---|---|
| | Sentence_ID=2 | <Speaker = Panelist 1><br><sync start = 11    sync end = 20><br><word/Yes, Of course./word> |
| | Sentence_ID=3 | <Speaker = Panelist 2><br><sync start = 21    sync end = 35><br><word/Many Children love to ride a bike, because they have a lot of concern for the environmental campaign./word> |

In Table 1, "File_ID" denotes a content identifier indicating the media content item, "Sentence_ID" denotes a section identifier indicating a media section, "Speaker" denotes speaker information, "sync start" denotes start of synchronization, "sync end" denotes end of synchronization, and "<word/ . . . /word>" denotes text included in the media section.

As shown in Table 1, media content items have different identifiers and media sections included in each media content item also have different identifiers. One media section includes a video portion, an audio portion, and a text portion. The text portion includes speaker information and a caption that is text inserted in "<word/ . . . /word>" and is synchronized with both the video portion and the audio portion. In the present invention, media sections, each having a text portion including a search term, are finally found as search results by determining whether or not the text portion includes a word/phrase/clause/sentence matching the search term. Synchronization of the caption with the video portion and the audio portion is set by the time information "sync start" and "sync end".

The search results are provided as a list of text portions, each including a word/phrase/clause/sentence matching the search term. Specifically, a plurality of media sections is finally found as search results and the search results are provided as a list of text portions of the media sections. A user terminal outputs the list including the text portions of the finally found media sections through a user interface. Each text portion included in the list is preferably access data for access to a corresponding media section. When a text portion is selected from the list, a media section associated with the selected text portion is streamed.

Since each text portion includes speaker information and a caption, the list may be a list of text items, each including speaker information, a list of text items, each including a caption, or a list of text items, each including speaker information and a caption. Captions may or may not be associated with speakers. When captions are associated with speaker information, the list may include text items, each including speaker information and a caption.

In the example of Table 1, when search of a search term "bike" has been requested, a media content item having text portions, each including "bike", is collected and a corresponding content identifier (File_ID) is stored. Then, media sections having text portions including "bike" are searched for in the collected media content item and corresponding section identifiers (Sentence_ID=1, Sentence_ID=3) are stored. The text portions of the media sections corresponding to the stored section identifiers are provided as a list to the user terminal. Here, the text portions included in the list are preferably access data for access to the corresponding media sections.

In addition, speaker identifiers are assigned to a plurality of speaker information included in text portions in order to discriminate between speakers of the plurality of speaker information included in the text portions and word, phrase, clause or sentence identifiers are also assigned to words, phrases, clauses, or sentences in order to discriminate between words, phrases, clauses, or sentences in captions which are text included in the text portions. The following Tables 2 and 3 illustrate an example applied to the media content structure of Table 1, wherein a speaker identifier (Speaker_ID) is assigned to each piece of speaker information as shown in Table 2 and a word identifier (Word_ID) is assigned to each word as shown in Table 3.

TABLE 2

| Speaker_ID | Speaker |
|---|---|
| 11 | Host |
| 12 | Panelist 1 |
| 13 | Panelist 2 |

TABLE 3

| Word_ID | word |
|---|---|
| 101 | The |
| 203 | children |
| 707 | of |
| 704 | today |
| 508 | are |
| 304 | interested |
| 705 | in |
| 670 | riding |
| 710 | a |
| 510 | bike |
| 703 | of |
| 450 | course |
| ... | ... |
| 530 | Many |
| 521 | love |
| 717 | to |
| 452 | ride |
| 903 | because |
| ... | ... |

The present invention suggests a method and system for providing and acquiring media content based on the above structure. Specifically, in the present invention, based on the above structure, it is possible to divide each media content item on a word, phrase, clause, or sentence basis to generate a plurality of media sections to be synchronized with words, phrases, clauses, or sentences.

Figure 1:
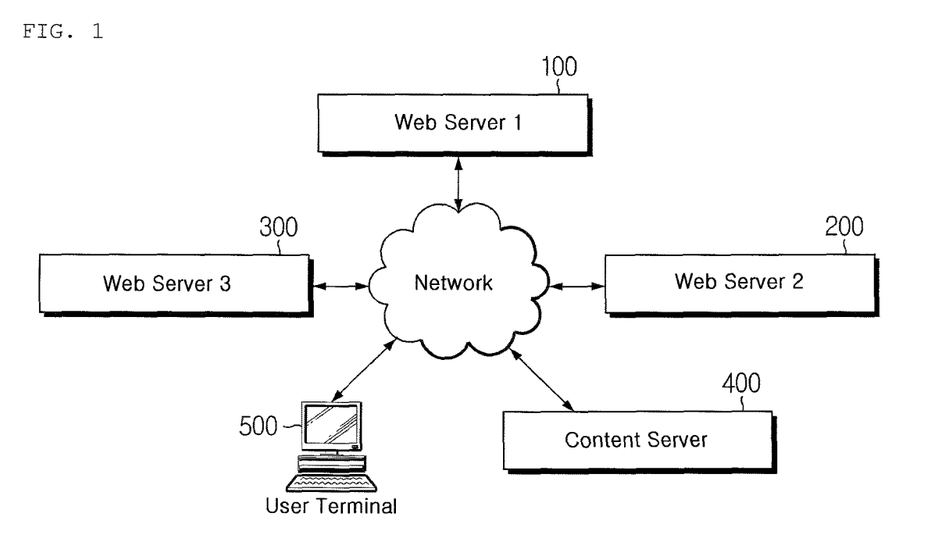
FIG. 1 is a block diagram illustrating a configuration of a system for providing and acquiring media content according to the present invention.

FIG. 1 is a block diagram illustrating a configuration of a system for providing and acquiring media content according to the present invention.

As shown in FIG. 1, a content server 400 collects media content and provides search results of the media content to a user terminal 500. The user terminal 500 selects one of the search results received from the content server 400 and acquires at least one media section of a media content item corresponding to the selected search result. This is a general procedure for providing and acquiring media content.

The method of the present invention does not provide the user with search results obtained based on metadata, file names (file titles), and file formats of media content items, which are determined when the media content items are generated, but instead provides the user with search results obtained based on text portions (including speaker information and captions) of media content items as a list of text items representing the text portions.

The content server 400 performs search based on a specific search term received from the user terminal 500. First, the content server 400 collects media content items including the received search term through the search operation. Here, it is preferable that the content server 400 search for media content items including the received search term in a database including a plurality of media content items to collect the media content items including the received search term. Alternatively, the content server 400 may collect media content items including the received search term from a plurality of web servers 100, 200, and 300 connected through a network as shown in FIG. 1. The media content items collected from the web servers 100, 200, and 300 preferably have the above structure.

The content server 400 preferably stores access data for access to the collected media content items and content identifiers of the collected media content items.

The content server 400 searches text portions (speaker information and/or captions) of media sections in the collected media content items and extracts media sections, each including a text portion including the search term, from the collected media content items. The content server 400 stores search results obtained in this manner while providing the search results to the user terminal 500.

Here, the content server 400 provides the search results to the user terminal 500 as a list of text items that are synchronized with the extracted media sections. For example, the search results are provided as a list of text portions including a word/phrase/clause/sentence matching the search term. Here, each text portion of the list is access data for access to a corresponding media section.

When a specific text portion is selected from the list, the user terminal 500 transmits a corresponding selection command to the content server 400.

Upon receiving the selection command from the user terminal 500, the content server 400 streams a corresponding media section to the user terminal 500.

The user terminal 500 contains an application for accessing the content server 400, inputting a search term, displaying a list of search results, displaying a stream of a media section, and displaying a text portion synchronized with the displayed media section. The application is provided from the content server 400 to the user terminal 500 and is then automatically installed in the user terminal 500.

As the application is executed on the user terminal 500, the user terminal 500 accesses the content server 400. The application has a user authentication function that requests input of a user ID and a password and automatically accesses the content server 400 only when user authentication is successful.

Figure 2:
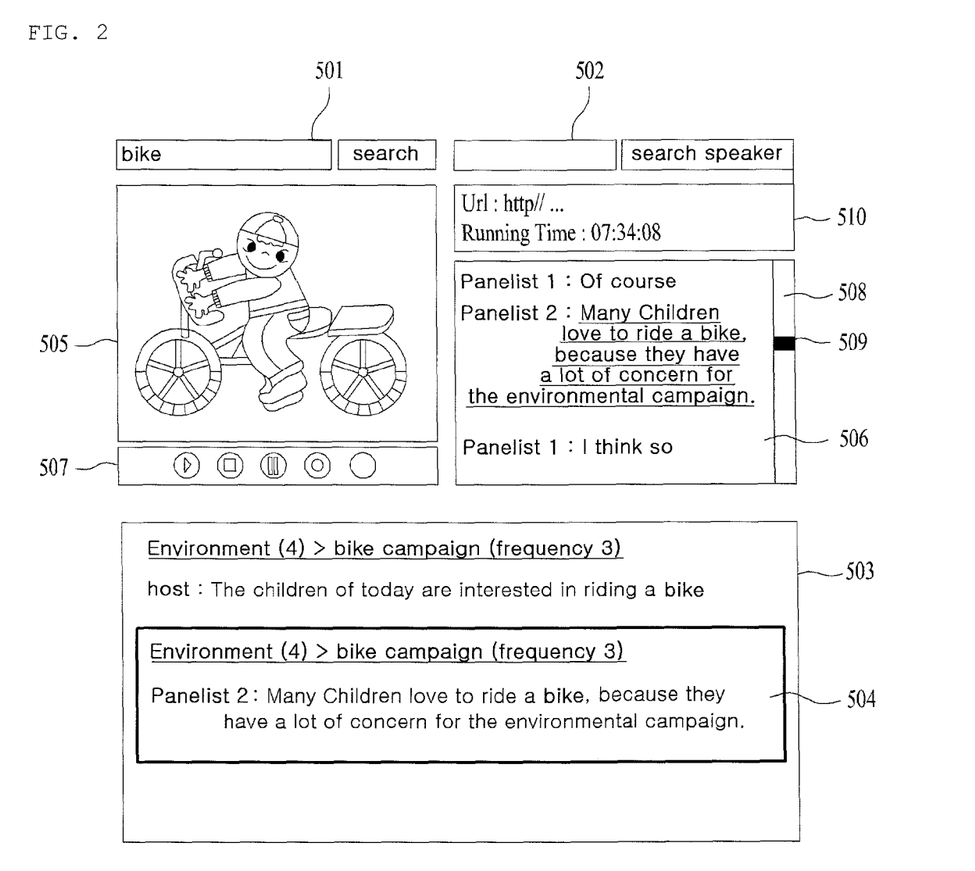
FIG. 2 illustrates a user interface screen displayed when an application is executed on a user terminal according to the present invention.

As the application is executed on the user terminal 500, a user interface is displayed on a screen of the user terminal 500 as shown in FIG. 2.

FIG. 2 illustrates a user interface screen displayed when an application is executed on a user terminal according to the present invention.

As shown in FIG. 2, the user interface displayed as the application is executed includes search term input regions 501 and 502 for providing a search term to the content server 400, a list display region 503 for displaying a list provided from the content server 400, a media display region 505 for displaying a media section, and a text display region 506 for displaying text that is synchronized with the media section displayed on the media display region 505.

The search term input regions 501 and 502 are provided to allow the user to input search terms. When a search term is input to each of the search term input regions 501 and 502, the input search term is provided to the content server 400. In the present invention, the user interface includes two search term input regions 501 and 502 that enable the user to input text corresponding to a caption as a search term and to input text corresponding to a speaker as a search term. That is, the search term input regions include the first region 501 for inputting, as a search term, a word, phrase, clause, or sentence of a caption corresponding to a text item that is synchronized with a media section to be searched for and the second region 502 for inputting, as a search term, speaker information associated with the caption.

The list display region 503 is provided to display a list of search results. The list display region 503 displays a list received from the content server 400 in response to input of the search term to each of the search term input regions 501 and 502.

Text included in the list includes a text portion of at least one found media section. The application has a function to sort text items included in the list according to a plurality of categories (or criteria). The categories may include the frequency of search by the user, the frequency of selection by the user, the length of the text item synchronized with the media section, the playback time of the media section, the position of the search term in the media section, and the number of media sections including the same search term in each media content item.

In another example, the list may include text items synchronized with media sections found as search results and may further include the playback time, copyright information, and price information of the media sections. The copyright information includes the copyright holders, copyright protection periods, and copyright expiration dates of the media sections found as search results.

The media display region 505 is provided to display a stream of a media section. When a specific text item included in the list display region 503 is selected, the media display region 505 displays a corresponding media section streamed from the content server 400.

The user interface displayed as the application is executed preferably includes a display control region 507 for controlling display-related operations such as play, stop, pause, and record of the media section displayed on the media display region 505.

When a specific text item 504 included in the list displayed on the list display region 503 is selected, the user terminal 500 transmits a corresponding selection command to the content server 400. This selection command preferably includes an identifier of a media section associated with the selected text item 504.

The content server 400 streams the media section associated with the selected text item 504 to the user terminal 500 in response to the received selection command. The user terminal 500 then displays the media section received in response to the selection command on the media display region 505.

As described above, a text item included in the list of the list display region 503 is access data for access to a corresponding media section. Therefore, it is preferable that, when a text item 504 is selected from the list, a media section associated with the selected text item be linked to and streamed to the user terminal.

The text display region 506 is provided to display a text portion of a media section currently displayed on the media display region 505. The text display region 506 further includes a scrollbar 508 indicating the total duration of a media content item including the media section currently displayed on the media display region 505 and an indicator 509 indicating the time position of a text item, which is synchronized with the currently displayed media section, in the total duration indicated by the scrollbar 508.

When the indicator 509 is moved to a position in the scrollbar 508, the user terminal 500 displays a media section corresponding to (i.e., synchronized with) a text item located at the position in the media display region 505. For example, if the user selects the text item synchronized with the currently displayed media section after moving the indicator 509 to the position of the text item, the user terminal 500 displays the media section synchronized with the selected text item on the media display region 505.

While the media section is displayed on the media display region 505, the application further displays displayed duration and address information (for example, a Uniform Resource Locator (URL)) of the media section. To accomplish this, the user interface displayed as the application is executed further includes a display region 510 for displaying the displayed duration and address information.

In another example, upon receiving the command to select the specific text item 504, the content server 400 may stream a media section temporally prior to the media section synchronized with the selected text item 504 to the user terminal 500 before streaming the media section synchronized with the selected text item 504. That is, the content server 400 may stream the media section synchronized with the selected text item 504 to the user terminal 500 after streaming the previous media section.

The content server 400 may further stream a media section temporally subsequent to the media section synchronized with the selected text item 504 to the user terminal 500 after streaming the media section synchronized with the selected text item 504.

In order to display the previous media section and the subsequent media section in addition to the media section selected from the media sections found as search results in this manner, the user terminal 500 receives and stores all text of media content items including the media sections found as search results. Then, when the previous media section and the subsequent media section in addition to the selected media section are displayed, the text display region 506 sequentially arranges and displays the text item synchronized with the previous media section, the text item synchronized with the selected media section, and the text item synchronized with the subsequent media section in chronological order.

A procedure for providing media content by the content server 400 and a procedure for acquiring media content by the user terminal 500 are described below with reference to the system configuration according to the present invention described above.

Figure 3:
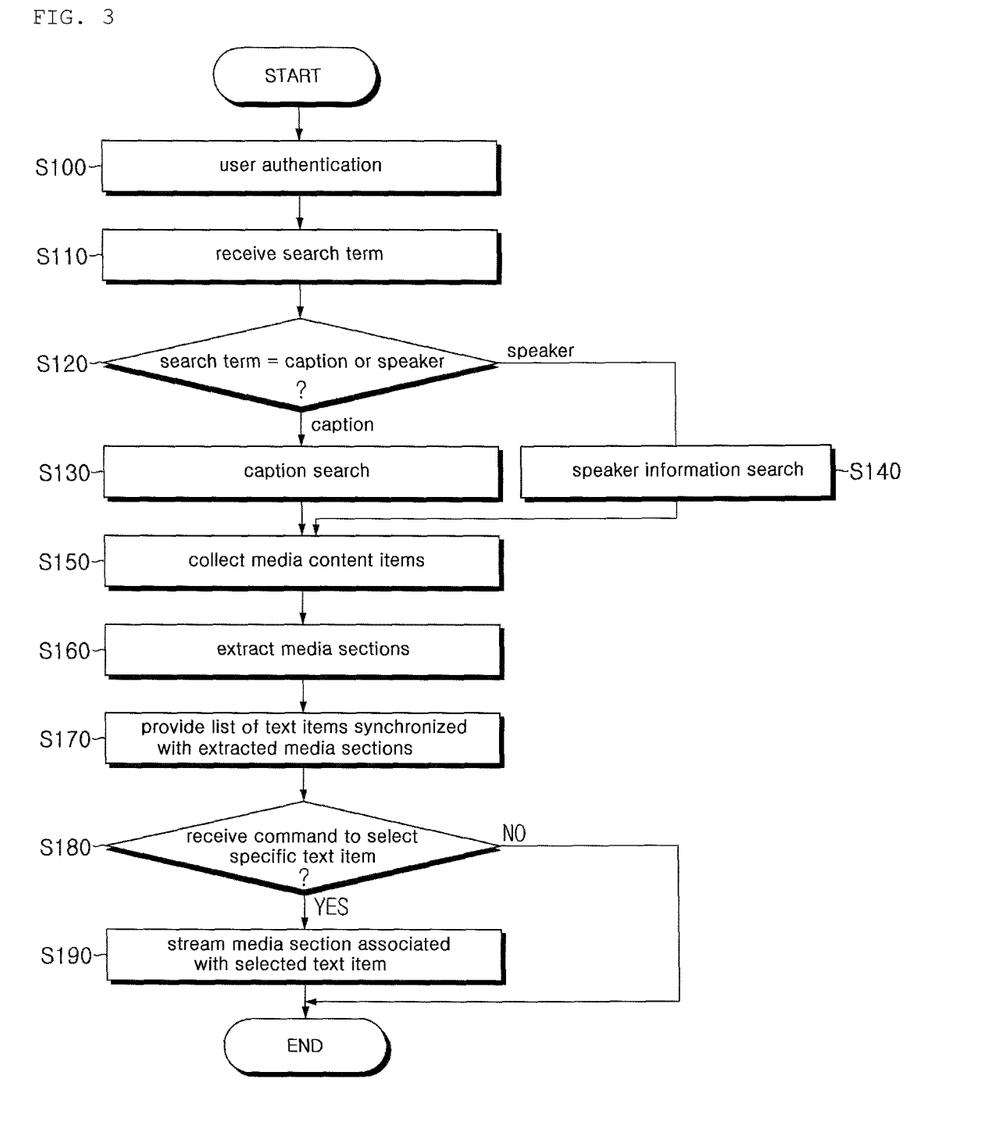
FIG. 3 is a flow chart illustrating a procedure for providing media content according to the present invention.
Figure 4:
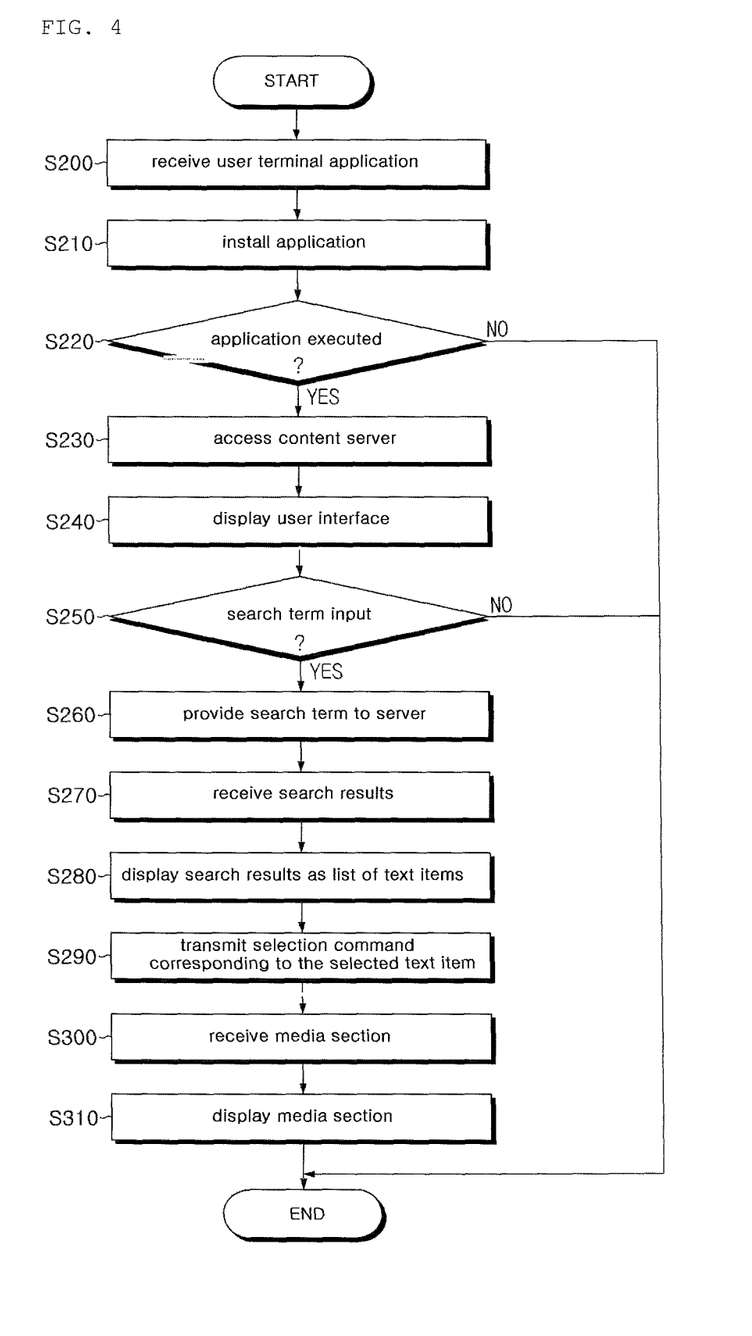
FIG. 4 is a flow chart illustrating a procedure for acquiring media content according to the present invention.

FIG. 3 is a flow chart illustrating a procedure for providing media content according to the present invention and FIG. 4 is a flow chart illustrating a procedure for acquiring media content according to the present invention.

First, a procedure in which the content server 400, which provides search results in response to a search request from the user terminal 500, provides media content is described as follows with reference to FIG. 3. In the present invention, the media content (or media content item) includes a plurality of media sections including a media section including a search term, each of which has been encoded in synchronization with a text expression including at least one word, phrase, clause, or sentence.

The content server 400 performs an authentication process for a user of the user terminal 500 that has accessed the content server 400 (S100).

The content server 400 receives a specific search term from the authenticated user terminal 500 (S110). Here, it is preferable that the content server 400 receive an identifier indicating that the search term corresponds to one of a word, phrase, clause, or sentence included in a caption together with the search term when the search term is of caption search or receive a speaker identifier indicating that the search term corresponds to a speaker together with the search term when the search term is of speaker search.

The content server 400 collects media content items including the search term through search based on input of the search term (S120-S150). Specifically, the content server 400 collects media content items including speaker information corresponding to the search term or including captions having the search term. The content server 400 searches for captions of media content items when the search term is of caption search (S120 and S130) and searches for speaker information of media content items when the search term is of speaker search (S120 and S140).

The content server 400 may store the collected media content items. Alternatively, the content server 400 may store the collected media content items in association with address information and content identifiers of the collected media content items.

The content server 400 extracts media sections including the search term from media sections included in the collected media content items (S160). The content server 400 may store the extracted media sections. The content server 400 may store the extracted media sections in association with address information and section identifiers of the extracted media sections.

The content server 400 provides a list of text items synchronized with the extracted media sections to the user terminal 500 (S170). The list includes captions synchronized with the extracted media sections and speaker information associated with the captions and may further include copyright information and price information of the extracted media sections and playback time of the media sections. As described above, the copyright information of the extracted media sections includes the copyright holders, copyright protection periods, and copyright expiration dates of the extracted media sections.

The content server 400 then checks whether or not a command to select a text item synchronized with one of the media sections, i.e., a specific text item included in the list, has been received (S180).

When a command to select a specific text item included in the list has been received, the content server 400 streams a media section associated with the selected text item to the user terminal 500 (S190).

The content server 400 may selectively stream a media section temporally prior to and a media section temporally subsequent to the media section synchronized with the selected text item, in addition to the media section synchronized with the selected text item, to the user terminal 500. For example, when the content server 400 streams an Nth media section associated with the selected text item to the user terminal 500, the content server 400 may additionally stream at least one of an N−1th media section temporally prior to and an N+1th media section temporally subsequent to the Nth media section synchronized with the selected text item.

Here, the content server 400 may stream the Nth media section associated with the selected text item while streaming all or part of the N−1th media section and all or part of the N+1th media section.

The content server 400 may rearrange and provide the list of text items according to a plurality of categories in response to a sort command received from the user terminal 500. The categories include the frequency of search by the user, the frequency of selection by the user, the length of the text item synchronized with the media section, the playback time of the media section, the position of the search term in the media section, and the number of media sections including the same search term in each media content item. Here, the user terminal 500 may also rearrange the list of text items according to the categories.

Next, a procedure in which the user terminal 500, which acquires search results from the content server 400, acquires media content is described as follows with reference to FIG. 4.

The user terminal 500 receives a user terminal application for search term input, search result display, and the like from the content server 400 (S200) and installs the received application (S210).

As the installed application is executed, the user terminal 500 accesses the content server 400 and displays a user interface associated with execution of the application on the screen (S220, S230, S240). Here, the user interface includes search term input regions 501 and 502, a list display region 503, a media display region 505, and a text display region 506.

After user authentication, the user terminal 500 checks whether or not a search term has been input to each of the search term input regions 501 and 502 of the user interface (S250). When a search term has been input to the search term input region 501 or 502, the input search term is provided to the content server 400 (S260). When a search term has been input to the first region 501 that is provided to input a word, phrase, clause, or sentence of a caption, an identifier indicating that the search term corresponds to a word, phrase, clause, or sentence of a caption is provided together with the search term to the content server 400. On the other hand, when a search term has been input to the second region 502 that is provided to input speaker information associated with a caption, a speaker identifier indicating that the search term corresponds to a speaker is provided together with the search term to the content server 400.

The user terminal 500 receives, as a search result(s), access data to a media section(s) including the input search term from the content server 400 (S270). Here, the search results are access data to at least one media section including a caption having the search term or including speaker information corresponding to the search term. The received access data, i.e., search results, are displayed as a list of text items on the list display region 503 (S280).

The user terminal 500 may rearrange the list of text items displayed on the list display region 503. That is, the user terminal 500 may sort the text items included in the list according to a plurality of categories. The categories include the frequency of search by the user, the frequency of selection by the user, the length of the text item synchronized with the media section, the playback time of the media section, the position of the search term in the media section, and the number of media sections including the same search term in each media content item.

When a specific text item of the displayed list has been selected, the user terminal 500 transmits a corresponding selection command to the content server 400 (S290).

The user terminal 500 receives a media section associated with the selected text item from the content server 400 in response to the selection command (S300).

The user terminal 500 displays the received media section on the media display region 505 (S310).

In another example, the user terminal 500 may receive a media section temporally prior to and a media section temporally subsequent to the media section associated with the selected text item in addition to the media section associated with the selected text item. The user terminal 500 displays the received media sections in chronological order. While displaying the received media sections in chronological order, the user terminal 500 may display text items synchronized with the displayed media sections on the text display region 506 and may additionally display displayed durations and address information (URLs) of the displayed media sections and may also additionally display copyright information and price information of the displayed media sections.

Here, when the user terminal 500 has received a media section temporally prior to and a media section temporally subsequent to the media section associated with the selected text item in addition to the media section associated with the selected text item, it is preferable that the user terminal 500 display a text item synchronized with the currently displayed media section such that the text item is distinguished from a text item synchronized with the previous media section and a text item synchronized with the subsequent media section.

MODE FOR INVENTION

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

INDUSTRIAL APPLICABILITY

In the present invention, it is possible to extract only necessary sections (media sections) from all of media content including a text (speaker information and captions) of a specific language. Thus, it can be applied to various language educations. For instance, in case that a media content, which corresponds to a movie, includes phrases/clauses/sentences having a term "bike" as an example, it is possible to search only sections (media sections) including the term "bike" from all of media content, and provide with them.

The invention claimed is:

1. A method for providing media content from a server that provides search results to a user terminal in response to a search request from the user terminal, the method comprising:

collecting a media content item including a search term through search based on input of the search term, wherein the media content item includes a plurality of media sections including a media section including the search term and each of the plurality of media sections comprises a text item including a word, a phrase, a clause, or a sentence;

extracting the media section including the search term from the plurality of media sections included in the collected media content item; and providing a text item synchronized with the extracted media section as a list, the provided text item including a word, a phrase, a clause, or a sentence matching the search term, wherein the text item includes at least one of a caption synchronized with the media section and speaker information associated with the caption, wherein the media content item includes a content identifier identifying the media content item, section identifiers identifying the plurality of media sections included in the media content item, and a word identifier, a phrase identifier, a clause identifier, or a sentence identifier identifying a word, a phrase, a clause, or a sentence in the caption included in the text item, and wherein, when the speaker information is included in the text item, the media content item further includes a speaker identifier identifying the speaker information.

2. The method according to claim 1, wherein collecting the media content item includes collecting a media content item including the caption having the search term or including speaker information corresponding to the search term.

3. The method according to claim 1, further comprising streaming, in response to a command to select the text item synchronized with the media section, a media section associated with the selected text item.

4. The method according to claim 3, wherein streaming the media section associated with the selected text item includes:

additionally streaming, when the media section associated with the selected text item is an Nth media section, at least one of an N−1th media section temporally prior to and an N+1th media section temporally subsequent to the Nth media section in chronological order.

5. The method according to claim 4, wherein streaming the Nth media section includes additionally streaming all or part of the N−1th media section and all or part of the N+1th media section.

6. The method according to claim 1, wherein text items included in the list are sorted according to categories including a frequency of search by a user, a frequency of selection by a user, a length of the text item synchronized with the media section, a playback time of the media section, a position of the search term in the media section, and the number of media sections including the same search term in each media content item.

7. An apparatus for providing media content, the apparatus comprising:

a server having a computer, the computer collecting a media content item including a search term received from a user terminal through search based on input of the search term, wherein the media content item includes a plurality of media sections including a media section including the search term and each of the plurality of media sections comprises a text item including a word, a phrase, a clause, or a sentence, providing the user terminal with a text item synchronized with the media section including the search term and extracted from a plurality of media sections included in the collected media content item as a list, wherein the provided text item includes a word, a phrase, a clause, or a sentence matching the search term, and streaming, upon receiving a command to select a text item included in the list from the user terminal, a specific media section corresponding to the selected text item to the user terminal, wherein the text item includes at least one of a caption synchronized with the media section and speaker information associated with the caption, wherein the media content item includes a content identifier identifying the media content item, section identifiers identifying the plurality of media sections included in the media content item, and a word identifier, a phrase identifier, a clause identifier, or a sentence identifier identifying a word, a phrase, a clause, or a sentence in the caption included in the text item, and wherein, when the speaker information is included in the text item, the media content item further includes a speaker identifier identifying the speaker information.

8. The apparatus according to claim 7, wherein the server provides an application for display of the list and display of the specific media section to the user terminal.

9. The apparatus according to claim 8, wherein the application has a function to sort text items included in the list according to a plurality of categories including a frequency of search by a user, a frequency of selection by a user, a length of the text item synchronized with the media section, a playback time of the media section, a position of the search term in the media section, and the number of media sections including the same search term in each media content item.

10. The apparatus according to claim 8, wherein the application further displays a displayed duration and address information of the specific media section while displaying the specific media section.

11. The apparatus according to claim 8, wherein the application has a function to display a user interface as the application is executed and the user interface includes a search term input region for providing the search term to the server, a list display region for displaying the list, a media display region for displaying the specific media section, and a text display region for displaying the text item synchronized with the specific media section displayed on the media display region.

12. The apparatus according to claim 11, wherein the search term input region includes a first region for inputting, as the search term, a word, phrase, clause, or sentence of a caption corresponding to the text item that is synchronized with the specific media section and a second region for inputting, as the search term, speaker information associated with the caption.

13. The apparatus according to claim 11, wherein the text display region further includes a scrollbar indicating a total duration of the media content item including the specific media section and an indicator indicating a time position of the text item synchronized with the specific media section in the scrollbar.

14. The apparatus according to claim 13, wherein the application has a function to display, when the indicator is moved to a position in the scrollbar, a media section corresponding to a text item located at the position in the media display region.

15. The apparatus according to claim 7, wherein, when a command to select the text item included in the list has been received from the user terminal, the server streams a media section temporally prior to the specific media section corresponding to the selected text item to the user terminal and then streams the specific media section to the user terminal.

16. The apparatus according to claim 15, wherein the server additionally streams a media section temporally subsequent to the specific media section to the user terminal after streaming the specific media section.

17. The apparatus according to claim 7, wherein the media content item including the search term is collected by searching a database including a plurality of media content items in the computer.

18. The apparatus according to claim 7, wherein the media content item including the search term is collected from a plurality of web servers.

19. The apparatus according to claim 7, wherein the server including the computer includes a memory, the memory storing the collected media content items, the text items, the extracted media sections, the content identifiers, or the section identifiers.

* * * * *